United States Patent [19]
Barber, Sr.

[11] Patent Number: 6,091,668
[45] Date of Patent: Jul. 18, 2000

[54] STATIC MARINE SEISMIC SYSTEM AND METHOD

[75] Inventor: Harold Pauley Barber, Sr., Fulshear, Tex.

[73] Assignee: SeaScan, Inc., Houston, Tex.

[21] Appl. No.: 09/073,470

[22] Filed: May 6, 1998

[51] Int. Cl.[7] .................................................. G01V 1/38
[52] U.S. Cl. .............................. 367/15; 367/15; 367/367; 367/16; 367/56; 367/57; 367/58; 367/24; 367/59; 367/23; 181/111; 181/115
[58] Field of Search ................................. 367/15, 56, 58, 367/59, 23, 16, 57, 24; 181/111, 115

[56] References Cited

U.S. PATENT DOCUMENTS

| | | | |
|---|---|---|---|
| 4,686,660 | 8/1987 | Glestrum et al. | 367/153 |
| 4,715,023 | 12/1987 | Oto | 367/153 |
| 4,716,553 | 12/1987 | Dragsund et al. | 367/15 |
| 4,721,180 | 1/1988 | Haughland | 181/111 |
| 4,956,822 | 9/1990 | Barber et al. | 367/23 |
| 5,469,404 | 11/1995 | Barber et al. | 367/23 |

*Primary Examiner*—John Barlow
*Assistant Examiner*—Anthony Jolly
*Attorney, Agent, or Firm*—Gardere & Wynne, L.L.P.

[57] ABSTRACT

A system and method for periodically providing information about subsurface formations in a marine environment using a non-towed seismic signal source (3) and a static array of seismic signal receivers (4) is disclosed. The seismic signal source (3) comprises a support frame (10) and a line (7) attaching the support frame to a stationary platform (2), wherein the line (7) restrains the support frame (10) in a position that is static in relation to the formation (8). The seismic signal source (3) includes eight air guns (12) attached to the support frame (10) such that the air guns (12) are discharged to provide a tapered, heavy centered, point source seismic signal at a specific location relative to the formation (8) that is reflected to the static array of seismic signal receivers (4) such that changes in the formation characteristics may be observed over time.

23 Claims, 4 Drawing Sheets

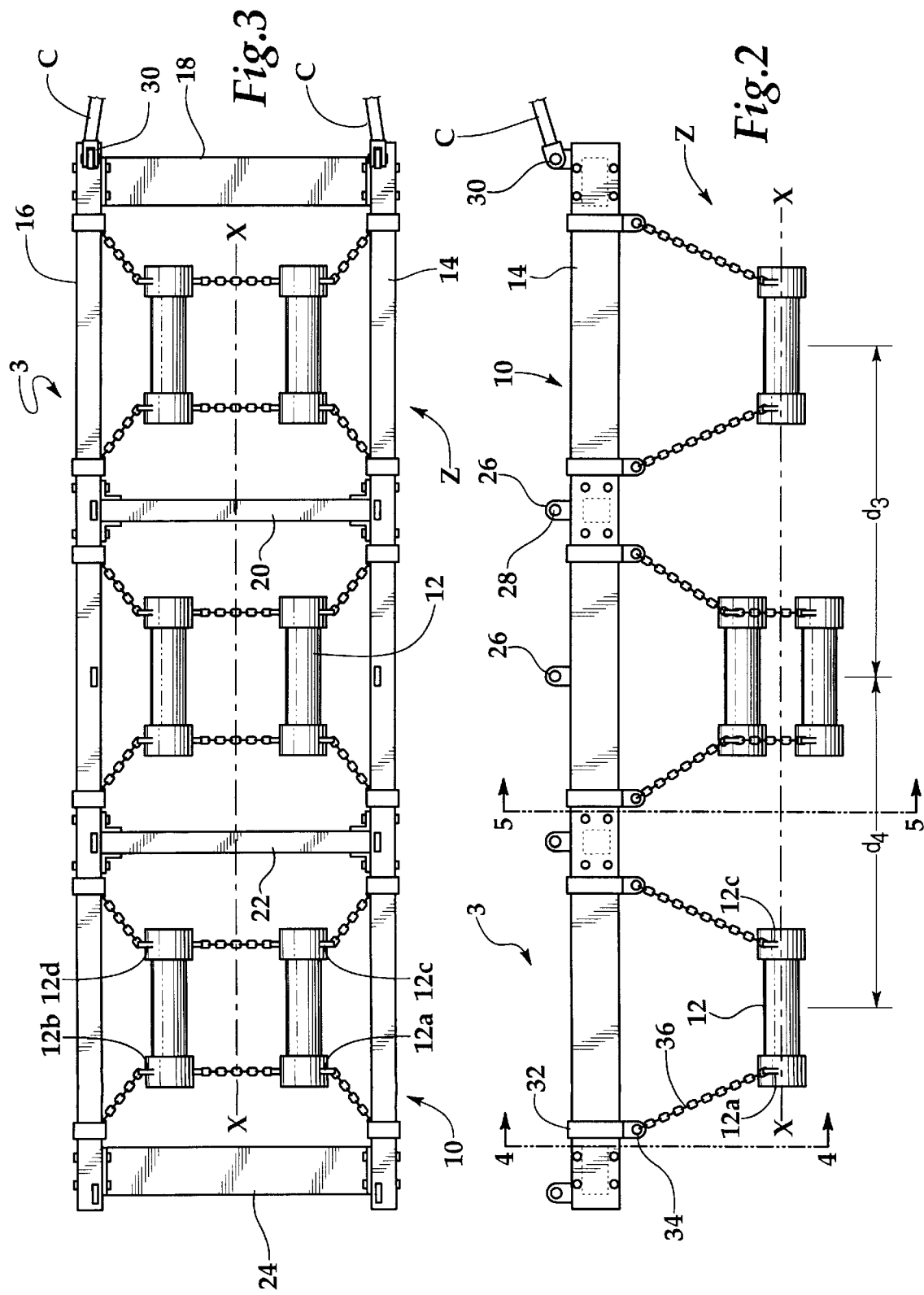

STATIC MARINE SEISMIC SYSTEM AND METHOD

TECHNICAL FIELD OF THE INVENTION

The present invention relates, in general, to the field of seismic exploration and, more particularly, to a static, high resolution marine seismic signal system for exploration of the earth's strata located below a body of water and depletion of hydrocarbon formations located therein.

BACKGROUND OF THE INVENTION

Without limiting the scope of the invention, its background is described in connection with marine seismic exploration of the earth's strata located below a body of water, usually offshore, as an example.

Heretofore, in the field of marine seismic exploration, seismic prospecting of hydrocarbons and other natural resources found in relatively deep formations of the earth's crust has required the use of offshore seismic survey data. Suitable offshore structures, such as, survey vessels, drill rigs, barges, or permanent platforms for drilling and production operations have been employed not only for drilling and removal of hydrocarbons, but also as locations for obtaining engineering or exploration survey data about the location and composition of the layers that form the earth's strata therebelow.

Seismic prospecting has been used in the industry to obtain the geological data necessary for directing drilling operations. Both in principle and in theory, seismic prospecting is relatively straightforward. A pulse of seismic energy is produced from, for example, the abrupt discharges of explosives or air guns which are transmitted through the earth's strata. The reflected energy signals from the subsurface strata and strata interfaces are detected and recorded by suitable instrumentation. The data recorded by the instrumentation is recorded and/or processed, for example, using source signal deconvolution to obtain a profile of the characteristics of the subsurface strata. The data provides information relating to depth, arrangement and thickness of the various layers or formations of the strata as well as information about the composition of the layers.

Numerous efforts and approaches have been used to improve the desired characteristics of seismic pulses for source signals to generate seismic energy that is used to characterize earth's strata. The background art in this area has been extensively summarized in, for example, U.S. Pat. Nos. 4,956,822 and 5,469,404 to Barber, et al., Although much has been written about seismic pulse or source signal creation and interpretation, present methods for the detection and processing of reflected energy signal data to predict the details of strata or formations under investigation remains extremely complex and quite difficult. The calculations are complex and difficult because each seismic energy source produces an energy signal that has unique characteristics or signature. In deconvolution, the signature of the signal are used to adjust the recorded data for those known imperfections in the seismic signal. Separating true reflected seismic signals in the recorded data from noise or other signal echos is an extremely difficult task and requires a great deal of skill and expertise.

In addition to providing information for developing a drilling program, it has been found that seismic data can be used throughout the life of a hydrocarbon field. For example, seismic data may be used to determine the rate of depletion or the rate and level of water encroachment. It has been found, however, that typical seismic exploration which is conducted by towing a seismic source behind a marine vessel may not produce seismic data that can be correlated with prior seismic data. This lack of repeatability is due, in part, to the inability to generate the seismic signal from the same location as that in a prior survey. Also, the use of different equipment to produce the seismic signal requires different deconvolution routines which adds to the uncertainty of the resulting data.

A need has therefore arisen for a high resolution marine seismic signal source that may be used throughout the life of a hydrocarbon field to provide geological data relating to the earth's strata there below that may be correlated with prior survey data to determine, for example, formation depletion. A need has also arisen for such a system that may be positioned in a precise and repeatable location such that the location of the seismic signal is fixed over time.

SUMMARY OF THE INVENTION

The present invention disclosed herein is a marine seismic system that includes a non-towed seismic signal source and a static array of seismic signal receivers. The seismic signal source and receivers may be used throughout the life of a hydrocarbon field to provide geological data that may be correlated over time for determination of formation depletion and the like. The seismic signal source may be deployed from, for example, an offshore production platform and is thereby easily placed at a repeatable location. The seismic signal receivers may be permanently placed on the sea floor. As such, the seismic signal source and receivers of the present invention provide geological data without the uncertainty caused by mobile systems and imprecise locations.

The seismic signal source of the present invention may be used in conjunction with high resolution marine seismic signal point sources formed by, e.g., an array of identical sized air guns that generate a powerful broad ban pulse. The pulse is preferably largely free of bubble pulse oscillations due to the array design. The seismic signal source apparatus disclosed herein is disposed below the water surface at a predetermined depth of between about one to four meters. The guns are arranged in a two times four times two (2×4×2) configuration, thereby providing a tapered, heavy center, point source. This 2×4×2 gun geometry provides a custom focus point source that is broad banded and thus provides low, medium and high frequencies, as well as, good penetration for targets located eight to ten seconds below the ocean floor or bottom mud line (BML).

In one embodiment, the seismic signal source array of the present invention is formed by a plurality of eight conventional air guns of, e.g., a 10 cubic inch chamber volume, each of which are suspended in a horizontal posture from a static support frame. The power output of the seismic signal formed by the array (80 cubic inch gun total volume using eight individual 10 cubic inch chamber volume guns) is ten bar meters, peak-to-peak, which is achieved in less than 1.0 milliseconds.

If an even higher frequency seismic content is desired for delineation of very fine subsurface structures, 4 cubic inch chamber volume air guns may be substituted for the 10 cubic inch guns in the array. Power output in this embodiment or configuration is approximately 7.1 peak-to-peak bar meters with usable data acquisitions in frequencies as high as 1 KHz.

Multiple gun chamber sizes of individual guns may be employed with the seismic signal source described herein. The inside volume of the individual guns that form the source array may be of: $10^3$, $20^3$, $40^3$, $70^3$, $100^3$, $150^3$ and $200^3$ inches and may be installed in an eight gun array in a 2×4×2 configuration. The corresponding overall output of the eight gun array would be: $80^3$, $160^3$, $320^3$, $560^3$, $800^3$, $1200^3$ or $1600^3$ inches of overall air volume in a desired range and may be preferably employed in one of several array configurations to produce the seismic signal. These different gun array volumes provide seismic signals having different signature characteristics depending on the object to be achieved as well as the depth and composition of the strata.

The seismic signal source described herein may be positioned at depths measured from the centerline of the array to the water surface. The depth to the centerline of the array may vary from, e.g., 1.0 to 4.0 meters. Alternative depths for use with the static marine seismic sound source described herein also include 2.25 meters and 3.0 meters.

Gun spacings may also vary with the smaller arrays used for engineering applications having, e.g., a 20 inch spacing along box axises while the larger arrays to be used for exploration will have 30 inch spacing or greater along both axises.

In yet another embodiment, the seismic signal source apparatus may be deployed in a static non-towed form extending from a platform and located below the surface of the water. The seismic source apparatus will include a support frame of suitable construction and dimension. The seismic signal source contains air guns that are mounted on the support frame to form three separate clusters of air guns with separations of 20 to 40 inches along both axises. Each cluster may also be located along the longitudinal axis with clusters 60 inches apart. A bridle and cable for deploying the seismic signal source from a platform can include a control umbilical cord and stress members. In addition, eight air lines and 20 electrical cables for providing air and electrical power from the surface may be provided to the submerged frame. The support frame may include suitable flotation equipment affixed thereto so that the seismic signal source is suspended below the water surface at a predetermined and desired depth.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2 is a side view of the static marine seismic signal source of the present invention;

FIG. 3 is the top view of the static marine seismic source of the present invention;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1A:
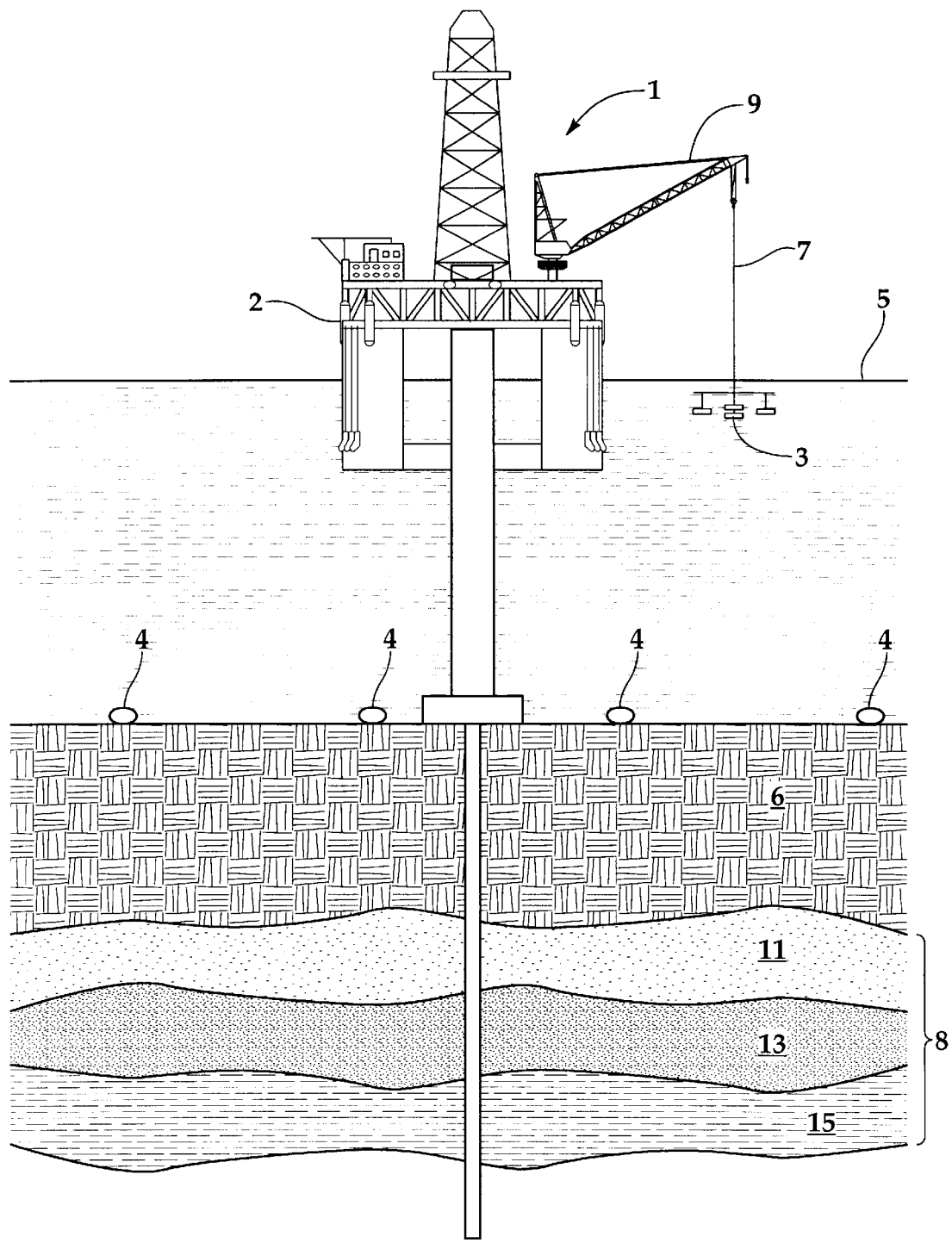
FIG. 1A is a schematic side view of a production platform having a seismic signal source of the present invention coupled thereto for use in conjunction with an array of static seismic signal receivers.

In FIG. 1A, a typical deployment of the static non-towed marine seismic system of the present invention is schematically illustrated and generally designated 1. A semisubmersible platform 2 floats in a body of water disposed above the sea floor. Below the sea floor is located the subsurface formations 6, 8 to be investigated by seismic exploration techniques using the method and apparatus of the present invention. The air/water interface is formed or defined by the water surface 5. The water surface 5 is typically or conventionally an offshore marine environment found in bays, oceans, gulfs and on inland waters such as lakes and rivers, but it will be understood that the present invention may be used in any marine environment including swamps, marshes, etc. Mounted on platform 2 is support equipment for handling and operating seismic signal source 3 of the present invention. Such suitable support equipment and its use and operation is well known to those of skill in the art and need not be set forth in detail. During conventional seismic exploration operations, platform 2 will be used to repeatedly position seismic signal source 3 of the present invention beneath water surface 5. Platform 2 may also serve to support a suitable array of seismic signal receivers, such as hydrophones 4 that receive the returned seismic signal from the subsurface formations 6, 8. Such signals are transmitted from the hydrophones 4 to platform 2 in a conventional manner for recording and processing of the signals for monitoring or observation of changes in formation is 8 such as in the location of gas cap 11 or the interface between oil 13 and water 15.

Alternatively, seismic signal receivers 4 may be permanently disposed on the sea floor (as depicted in FIG. 1) or may be placed beneath the sea floor within formation 6. In any configuration, however, it is desirable that the seismic signal receivers 4 are placed in the same location or permanently remain in the same location for each use of seismic signal source 3 throughout the life of platform 2.

During the use of seismic signal source 3 of the present invention, control cable umbilical harness, or support line 7 extends between the seismic signal source 3 and a conventional support structure 9 that may be used to deploy and retrieve the seismic signal source 3. The cable apparatus 7 can include the support cable or structural roll member, as well as, the conventional umbilical gun firing control and high pressure air supply and electrical connections 7 for the seismic signal source 3. The air guns of the seismic signal source 3 may be fired by remote control and are refurbished with air using a high pressure air supply. Both the remote control and the air pressure supply are conventionally located on the platform 2 and operably connected by the cable apparatus 7 to the seismic signal source 3. The umbilical cable apparatus 7 is well known to those of skill in the art and need not be described in detail.

It is contemplated that the seismic signal source 3 of the present invention will be operated on a periodic basis, such as monthly or yearly to monitor changes in the fluid levels within formation 8. Specifically, the seismic signal source 3 and the seismic signal receivers 4 may be used to provide information relating to the location of gas cap 11 as well as the interface between oil 13 and water 15 as production from formation 8 proceeds. For example, if it is desired to produce oil 13 from formation 8, the pressure within formation 8 will decrease over time. This decrease in pressure will cause gas cap 11 to expand thereby lowering the interface between gas 11 and oil 13. Similarly, as the volume of oil 13 within formation 8 is reduced due to production, water 15 will continue to migrate upward thereby causing the level of the interface between oil 13 and water 13 to rise. With the periodic use of the static non-towed marine seismic system of the present invention, this type of formation information may be gathered and compared with prior data to determine the rate at which changes are taking place within formation 8. This information may be used in the planning of additional drilling operations or in scheduling a workover program for a field.

Figure 1B:
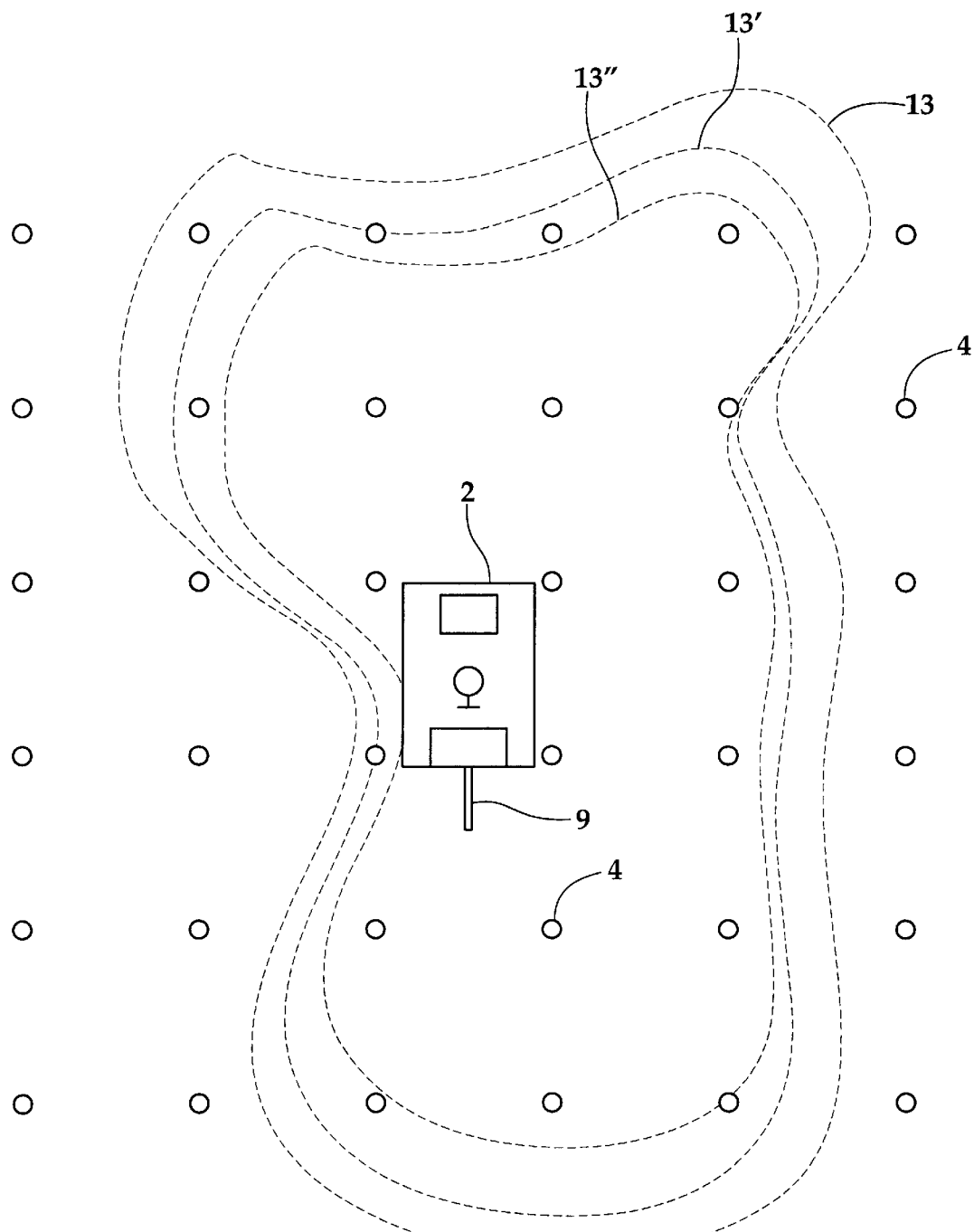
FIG. 1B is a plan view of a production platform positioned over an oil play and an array of static seismic signal receivers.

Now turning to FIG. 1B, a plan view of platform 2 and an array of seismic signal receivers 4 is depicted. The seismic signal source 3 is suspended from support structure 9 of platform 2. A plurality of seismic signal receivers 4 are oriented in an array beneath platform 2. FIG. 1B depicts a symmetric array of seismic signal receivers 4 in a square configuration with platform 2 located at the center of the square. This particular orientation of seismic signal receivers 4 is presented as an example as it should be apparent to those skilled in the art that seismic signal receivers 4 may be place in any number of orientations.

FIG. 1B also depicts the depletion of oil 13 from formation 8 of FIG. 1A. The dotted line designate 13 represents the initial reserves of oil obtained, for example, using the static non-towed marine seismic system of the present invention deployed from platform 2 prior to production of fluids from formation 8. After a predetermined production period from formation 8, a subsequent deployment of the static non-towed marine seismic system of the present invention may occur. The results of the subsequent deployment are depicted by the dotted line designated 13' which represents the real time oil reserves in formation 8. Similarly, after another period of production from formation 8, a subsequent deployment of the static non-towed seismic system of the present invention may yield oil reserves which are represented by the dotted line designated 13". Thus, the use of the static non-towed seismic system of the present invention may provide substantial valuable information that may be used throughout the life of formation 8.

The seismic signal source 3 of the present invention is illustrated in greater detail in FIGS. 2–5. The seismic signal source 3 includes a static support frame, generally designated 10, operably mounting a plurality of air guns 12 for forming a desired seismic signal. The eight air guns 12 can be identical and of conventional, commercially available types. The static support frame 10 may be formed of any desired configuration or shape, but for convenience a static support frame 10 having longitudinally extending side members 14 and 16 connected by longitudinally spaced parallel cross braces 18, 20, 22 and 24 can be used. A variety of methods may be used for the construction and assembly of the static support frame 10 such as welding and riveting, however, for ease of assembly and transportation and to allow flexibility during firing, a bolted construction of conventional steel beams is most desirable. As best shown in conjunction with FIGS. 4 and 5, conventional rectangular cross sections composed of structural steel members may be used as material for the construction or fabrication of a static support frame 10. After fabrication, a suitable protective coating may be applied to the frame to retard corrosion of the static support frame 10 when used in marine environments, such as, marine paint.

Figure 4:
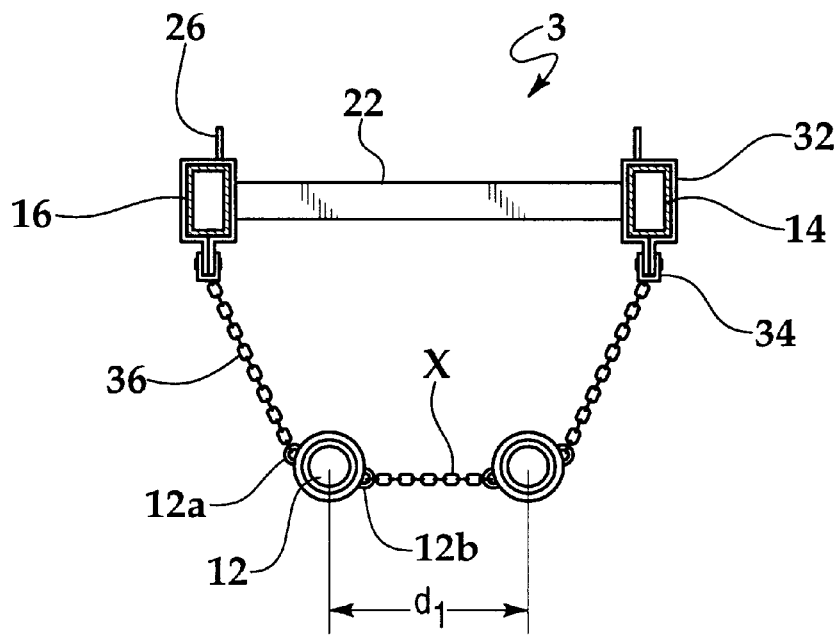
FIG. 4 is a view taking along line 4—4 FIG. 2.
Figure 5:
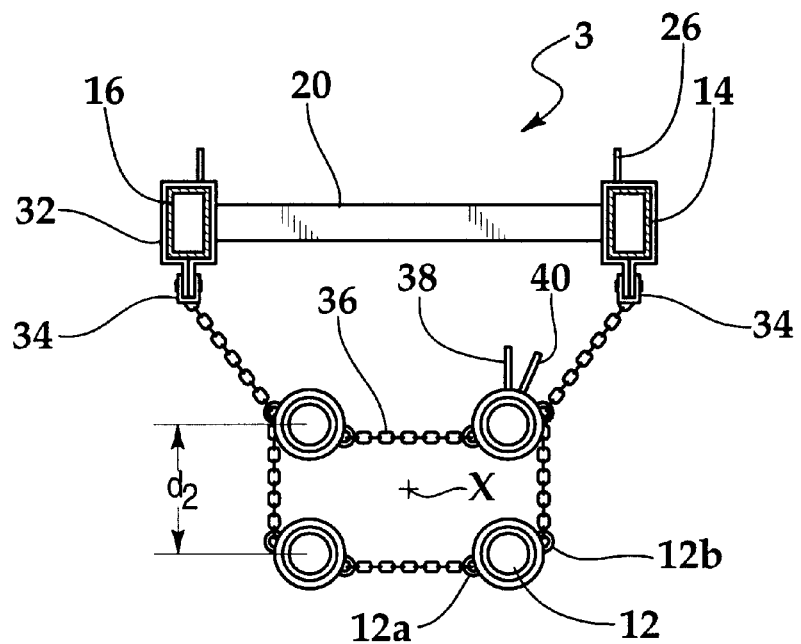
FIG. 5 is a view taking along the 5—5 line of FIG. 2.

The precise arrangement of the four frame cross members 18, 20, 22 and 24 is not critical but may be preselected for strength, weight and flexibility purposes. The most desirable method of affixing the longitudinally spaced parallel cross braces 18, 20, 22 and 24 is illustrated in FIGS. 4 and 5 using a bolting arrangement. The bolts secure the cross member 18, 20, 22 and 24 with side members 14 and 16 and provide for rapid assembly and disassembly as well as ease and convenience of transportation. Most importantly, the bolted assembly allows for flexibility of support frame 10 during firing of air gun 12.

Secured to the static support frame 10, on each of the side members 14 and 16, are one or more attachment fittings 26 that provide a way of securing the static support frame 10. The number of fittings 26 should be sufficiently large to accommodate planned or unanticipated needs for attachment to the static support frame 10 during use, handling and transportation.

Each of the attachment fittings 26 may be provided with a hole or opening 28 for receiving a connection bolt of a conventional and fitting secured to one end of, e.g., an attachment chain or line, such as the y or yoke fitting 30 at the end of a towing cable. The attachment fittings 26 thus provide a way of securing the static support frame 10 to cable 7 extending from platform 2. Other ways or arrangements for securing the static support frame 10 of the present invention to a floating platform will be apparent to those of skill in the art.

The attachment fittings 26 also function to assist in locating the static support frame 10 at a desired depth in the water below the air/water interface or water surface 5. A suitable buoyant frame support or float may alternatively be used in conjunction with the static support frame 10 to achieve the desired depth below water surface 5. In either configuration, preferably the air guns 12 are disposed at a relatively shallow depth such as one to four meters below the air/water interface to minimize reflection of ghost echoes and bubble pulsation.

In one embodiment, one or more identical longitudinally split lines are generally provided that are rectangular in shape having adjustable clamps 32. Another structure for performing this function, such as attachment fittings 26, may be employed by those of skill in the art in light of the present invention. The clamps 32, however, are preferred as their secured position along side members 14 and 16 may be quickly adjusted as desired.

Suitable bolting 34 is used to releasably secure the surrounding clamps 32 to frame members 14 and 16 and may also be used to attach the chains, cables or the like to the air guns 12. While the chain arrangement, generally designated 36, is preferred for mounting the air guns 12 to the clamps 32, many other desired mounting arrangements will be apparent to those of skill in the art. The chain arrangement 36 is preferred because of the flexibility and use of installation, adjustment and maintenance.

As illustrated in FIGS. 4 and 5, each of the identical, cylindrical shaped conventional air guns 12 have a pair of attachment lugs 12a and 12b placed or formed thereon at one end for attachment to the plurality of chain links forming the chain arrangement 36 used to secure the air guns 12 with the static support frame 10 and with each other. Each of the air guns 12 forming the array are preferably identical in construction in having a uniform gun chamber volume. For this reason, the location of air guns 12 and the arrays are interchangeable. The air guns 12 may be identical and can be, for example, Halliburton type SG-1 or SG-II B sleeve guns.

As best illustrated in FIGS. 2 and 3, the other end of each air gun 12 is provided with a similar pair of attachment lugs 12c and 12d to maintain each of the air guns 12 horizontally disposed and in a relatively fixed position to each other to form the desired air gun source array during normal operations. As illustrated schematically in FIG. 5, each of the air guns 12 is operably connected to the air and electrical connections 7 by conduits 38 and 40 for providing gun firing signals and a continuing supply of high pressure air to each of the air guns 12. The eight air guns 12 can be located on the static support frame 10 in a paired two by four by two arrangement to form the desired geometry of the array. For purposes of describing the geometric arrangement of the air gun 12 array, a longitudinal axis X—X as illustrated in FIGS. 2 and 3 will be used as a reference axis although the geometrical relationship of the air guns 12 forming the array may be described from any other desired position or reference.

The strength, stress or length of the cable apparatus 7 will depend on the length of time that the seismic signal source 3 of the present invention is expected to be in place. The cable apparatus 7 is connected to the attachment fitting 26 adjacent the front cross member 18 by conventional bridle or yoke 34. As illustrated in FIGS. 2 and 4, a pair of air guns 12 are operably mounted on the static support frame 10 between the first cross member 18 and the second cross member 20 and secured at a common distance below the static support frame 10. As illustrated in FIG. 3, the array geometry layout of the identical air guns 12 mounted between the third cross member 22 and the fourth cross member 24 is identical to that of the air guns 12 located between cross members 18 and 22. The longitudinal axis of each of these four cylindrical air guns 12, lies in the same horizontal plane as the longitudinal axis X—X. The depth of the horizontal plane below the water surface is determined by the chain arrangement 36 and length of lines that support the seismic signal source 3 of the present invention.

The longitudinal axis of the two paired outside air guns 12 adjacently to end cross braces 18 and 24 on each side of axis X—X are also aligned. This alignment of the longitudinal axis air guns 12 is also parallel to the axis X—X with the paired guns 12 disposed on opposite sides and equidistant from the longitudinal axis X—X. The horizontal width distance or spacing between the center or longitudinal axis of these pairs of air guns 12 is shown in FIG. 4 as $d_1$, and with the equidistant spacing of each gun from a longitudinal axis X—X between $d_1/2$.

As best illustrated in conjunctions with FIGS. 3 and 5, the four air guns 12 mounted between the cross members 20 and 22 have the same paired horizontal width relationship ($d_1$) as the outside paired air guns 12 between cross braces 18 and 20 and cross braces 22 and 24. The four centered air guns 12 between cross braces 20 and 22, however, do not lie in the horizontal plane formed by the longitudinal axis X—X. Instead, these air guns 12 are spaced or positioned a uniform or equal distance above or below the horizontal plane passing through axis X—X as will be appreciated from the cross sectional view of FIG. 5. This arrangement may be described as a horizontal pairing of air guns 12 with one pair disposed above axis X—X and another pair located below the axis X—X. This arrangement may also be described as pairs of air guns 12 disposed in vertical planes on opposite sides of the axis X—X, but the actual geometric arrangement is identical in both descriptions.

The vertical plane spacing or distance between the air guns 12 mounted between cross members 20 and 22 as shown as distance $d_2$, with the air gun 12 spacing above and below the horizontal plane defined by the longitudinal axis X—X being half of the distance $d_2$ or $d_2/2$.

As best illustrated in conjunction with FIG. 3, the location of the air guns 12 results in a geometric arrangement in which the longitudinal axis of each of the four cylindrical air guns 12 on one side of the longitudinal axis X—X of the array are positioned in a common vertical plane while the four air guns 12 located on the other side of axis X—X are disposed in another common vertical plane. The horizontal distance between these two vertical planes is also defined by $d_1$, and with the equidistant spacing from a vertical plane passing through axis X—X being $d_1/2$.

The longitudinal spacing or horizontal length distance between the centers of the plurality of air guns 12 forming the array are shown in FIGS. 2 and 3. The horizontal distance between the geometric center of air guns 12 between cross frame members 18 and 20 and frame members 20 and 12 is referenced as $d_3$ while that of the air guns 12 between frame members 20 and 22 and frame members 22 and 24 is shown as dimension $d_4$. Preferably, the distances $d_3$ and $d_4$ are the same or equal so that the air guns 12 adjacent to outer frames 18 and 24 of the same uniform distance from the two air gun 12 pairs located between cross braces 20 and 22. This provides the desired two by four by two geometric arrangement of the array, giving the characteristics of a tapered, heavy centered point source.

The chamber volume or size of the individual air guns 12 forming the array may be selected as desired. Contrary to known tuned arrays, the chamber volume of the air guns 12 are identical in size. The eight air guns 12 are provided with common or uniform sized firing chambers ranging in size from four cubic inches to two hundred cubic inches each. Air guns 12 having two common chamber sizes or volumes have been found well-suited and may be used in this array configuration. If ten cubic inch chambered air guns 12 are employed, an array total chamber volume of eighty cubic inches results. If higher frequency content of the seismic output signal of the array is desired, such as for the delineation of fine structures, the same array geometry and dimensions are maintained. The chamber volume of each of the eight air guns 12, however, is reduced to four cubic inches to reduce the array total volume to thirty-two cubic inches. This arrangement provides a total chamber volume range for the s array of thirty-two cubic inches to eighty inches. Likewise, the content of the seismic output signal may be a lower frequency, as such, the individual air gun 12 volume may be increased to, e.g., twenty, forty, seventy, one hundred, one hundred fifty and two hundred cubic inches. The total volume chamber would increase by eight fold of the individual air gun 12 chamber volume to, e.g., eighty, one hundred sixty, three hundred twenty, five hundred sixty, eight hundred, twelve hundred or sixteen hundred cubic inches for the total air volume of the arrays, respectively.

In operation, the static support frame 10 is assembled in the manner illustrated in FIGS. 1–5. The cylindrical air guns 12 are operably mounted with the static support frame 10 using the chain or cable assembly and in the case of the larger guns, stainless steel springs may be used in the array having a two by four by two configuration. When it is desired to conduct a seismic survey, firing signals are transmitted from the platform 2 through the cable apparatus 7 to fire the air guns 12. The air guns 12 are timed to fire substantially simultaneously in order that the output energy of each gun occurs concurrently to enhance and maximum total peak energy output of the array. Normally, the simultaneous firing 5 sequence for all air guns 12 in the array is achieved with a tolerance of plus or minus two hundred milliseconds.

Alternatively, air guns 12 may be fired in a top to bottom time delay sequence to shift the frequency domain of the peak acoustical signal to concentrate the usable seismic energy in the deeper earth formation penetrating range as described in U.S. Pat. No. 5,469,404 to Barber et al. which is hereby incorporated by reference.

In either case, the seismic signal then travels downward into the earth and is reflected back upward at interfaces between strata, such as between formations 6, 8. The arrival of reflected seismic signals are detected by seismic signal receivers 4 and transmitted to suitable instrumentation on platform 2 where processing will be performed to determine the change over time of the constituents in, for examples, formation 8 such as the location of the gas cap 11 and the location of the interface between oil 13 and water 15.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system of monitoring geological changes of a subsurface formation in a marine environment over time comprising:
    a non-towed seismic signal apparatus for producing a seismic signal that is repeatably positionable above subsurface formation and beneath the surface of a body of water; and
    at least one non-towed seismic signal receiver disposed remotely from the non-towed seismic signal apparatus and beneath the surface of a body of water, wherein during a plurality of operating modes, the seismic signal apparatus and the at least one seismic signal receiver are in substantially the same orientation with respect to one another and with respect to the subsurface formation.

2. The system as recited in claim 1 further comprising a substantially static support structure for supporting the seismic signal apparatus such that the seismic signal apparatus is repeatably positionable above the subsurface formation.

3. The system as recited in claim 2 wherein the substantially static support structure is a platform.

4. The system as recited in claim 1 wherein the seismic signal apparatus further comprises a support frame and a plurality of air guns.

5. The system as recited in claim 4 wherein the plurality of air guns forms an array providing a tapered, heavy centered, point source seismic signal when the air guns are discharged.

6. The system as recited in claim 4 wherein the plurality of air guns are mounted in a two by four by two configuration.

7. The system as recited in claim 4 wherein each of the air guns in the plurality of air guns has substantially the same chamber volume.

8. The system as recited in claim 4 wherein each of the air guns in the plurality of air guns has a chamber volume between about four and two hundred cubic inches.

9. The system as recited in claim 1 wherein the at least one seismic signal receiver is an array of seismic signal receivers.

10. A system of monitoring geological changes of a subsurface formation in a marine environment over time comprising:
    a non-towed seismic signal apparatus for producing a seismic signal;
    a substantially static support structure for supporting the seismic signal apparatus such that the seismic signal apparatus is repeatably positionable above the subsurface formation and beneath the surface of a body of water; and
    at least non-towed one seismic signal receiver disposed remotely from the non-towed seismic signal apparatus and beneath the surface of the body of water, wherein during a plurality of operating modes, the seismic signal apparatus and the at least one seismic signal receiver are in substantially the same orientation with respect to one another and with respect to the subsurface formation.

11. The system as recited in claim 10 wherein the substantially static support structure is a platform.

12. The system as recited in claim 10 wherein the seismic signal apparatus further comprises a support frame and a plurality of air guns.

13. The system as recited in claim 12 wherein the plurality of air guns forms an array providing a tapered, heavy centered, point source seismic signal when the air guns are discharged.

14. The system as recited in claim 12 wherein the plurality of air guns are mounted in a two by four by two configuration.

15. The system as recited in claim 12 wherein each of the air guns in the plurality of air guns has substantially the same chamber volume.

16. The system as recited in claim 12 wherein each of the air guns in the plurality of air guns has a chamber volume between about four and two hundred cubic inches.

17. The system as recited in claim 10 further comprising a control system located on the substantially static support structure, at least one electrical connection extending between the control system and the seismic signal apparatus and at least one air connection extending between the control system and the seismic signal apparatus.

18. The system as recited in claim 10 wherein the at least one seismic signal receiver is an array of seismic signal receivers.

19. A method of monitoring geological changes of a subsurface formation in a marine environment over time comprising the steps of:
    positioning a non-towed seismic signal apparatus above the subsurface formation and beneath the surface of a body of water;
    disposing at least one non-towed seismic signal receiver remotely from the non-towed seismic signal apparatus and beneath the surface of the body of water;
    operating the seismic signal apparatus to generate a seismic signal and receiving the arrival of reflections from the subsurface formation to establish baseline geological data regarding the subsurface formation;
    after a predetermined time period, providing the seismic signal apparatus and the at least one seismic signal receiver in substantially the same orientation with respect to one another and with respect to the subsurface formation as used during the prior operating mode;

operating the seismic signal apparatus to generate a seismic signal and receiving the arrival of reflections from the subsurface formation to obtain subsequent geological data regarding the subsurface formation; and comparing the baseline geological data with the subsequent geological data to monitor geological changes of the subsurface formation over time.

20. The method as recited in claim 19 further comprising the step of supporting the seismic signal apparatus with a substantially static support structure.

21. The method as recited in claim 19 wherein the step of steps of operating the seismic signal apparatus to generate a seismic signal further comprise discharging a plurality of air guns in a support frame.

22. The method as recited in claim 21 wherein the step of discharging the air guns further comprises providing a tapered, heavy centered, point source seismic signal.

23. The method as recited in claim 19 wherein the step of disposing at least one seismic signal receiver beneath the surface of the body of water further comprises disposing an array of seismic signal receivers beneath the surface of the body of water.

* * * * *